(12) United States Patent
Cross et al.

(10) Patent No.: US 7,482,391 B1
(45) Date of Patent: Jan. 27, 2009

(54) FOAMING RTV SILICONE COMPOSITIONS

(75) Inventors: Robert Cross, Rocky Hill, CT (US); Lester D. Bennington, East Hartford, CT (US); Bahram Issari, Rocky Hill, CT (US); John Kerr, West Hartford, CT (US)

(73) Assignee: Henkel Corporation, Rocky Hill, CT (US)

(*) Notice: Subject to any disclaimer, the term of this patent is extended or adjusted under 35 U.S.C. 154(b) by 479 days.

(21) Appl. No.: 11/124,207

(22) Filed: May 9, 2005

(51) Int. Cl.
  *C08J 9/02* (2006.01)
  *C08L 83/04* (2006.01)
  *C08G 77/18* (2006.01)

(52) U.S. Cl. .................. 521/91; 521/110; 521/111; 521/154; 525/100; 525/478; 525/479; 528/32; 528/34; 528/35

(58) Field of Classification Search .......... 521/91, 521/110, 111, 154; 525/100, 478, 479; 528/32, 528/34, 35
See application file for complete search history.

(56) References Cited

U.S. PATENT DOCUMENTS

| | | | | | |
|---|---|---|---|---|---|
| 4,489,199 | A | * | 12/1984 | Wengrovius | 528/16 |
| 5,183,873 | A | * | 2/1993 | Viksne | 528/16 |
| 5,625,022 | A | * | 4/1997 | Onishi | 528/15 |

* cited by examiner

*Primary Examiner*—Irina S Zemel
(74) *Attorney, Agent, or Firm*—James E. Piotrowski; Steven C. Bauman

(57) ABSTRACT

Room-temperature vulcanized (RTV) foaming compositions are disclosed. The compositions include at least one enoxysilyl functional group and/or at least one alkoxysilyl functional group, at least one amine catalyst, and at least one silicon hydride functional group. Also disclosed are methods of preparing such compositions and methods of using such compositions, methods for making a gasket, and articles of manufacture.

21 Claims, No Drawings

US 7,482,391 B1

FOAMING RTV SILICONE COMPOSITIONS

FIELD OF THE INVENTION

The present invention relates to foaming room-temperature vulcanized (RTV) silicone compositions. The present invention also relates to methods for preparing these compositions and methods of using such compositions.

BRIEF DESCRIPTION OF RELATED TECHNOLOGY

Elastomeric foaming compositions are routinely used as sealants and adhesives in a variety of industries, including the electronics and automotive industries. As is known, such compositions can be formed by means of vulcanization, including heat vulcanization or room-temperature vulcanization.

RTV compositions can be formed from multi-component systems and single component systems. In contrast to multi-component RTV systems, single component RTV systems contain all the components necessary for vulcanization. The components of single-component RTV compositions will react only upon contact with atmospheric water vapor and, therefore, must contain compounds having easily hydrolyzable groups.

It is well-known that foaming can occur prematurely during mixing of the components of multi-component systems if mixing conditions are not optimal. Such premature foaming compromises the effectiveness of the resultant composition formed by the mixing. Moreover, a blowing agent (such as an external source of compressed gas) is often required to effectuate foaming, as is heat when non-RTV systems are used. The utilization of a blowing agent or heat, however, may not be desirable in certain applications.

Single component systems avoid the premature foaming problem attendant multi-component systems because such systems obviate the need to mix components in dispensing equipment prior to application to a substrate. Notwithstanding the state of the art, there remains a need for single component RTV systems. Moreover, there is a need for multi-component compositions that (i) do not foam until dispensed and (ii) can foam in the absence of an external blowing agent or heat.

SUMMARY OF THE INVENTION

In one aspect of the invention, there is provided a foaming RTV silicone composition including: (a) at least one compound having at least one enoxysilyl functional group; (b) at least one compound having at least one alkoxysilyl functional group; (c) at least one compound having at least one silicon hydride functional group; and (d) a hindered amine, where hydrogen gas is generated upon exposure of the composition to moisture, resulting in foaming of the composition.

In another aspect of the invention, there is provided a method for preparing a foaming RTV composition including the steps of mixing: (a) at least one compound having at least one enoxysilyl functional group; (b) at least one compound having at least one alkoxysilyl functional group; (c) at least one compound having at least one silicon hydride functional group; and (d) a hindered amine to form a composition, where hydrogen gas is generated upon exposure of the composition to moisture, resulting in foaming of the composition.

In still another aspect of the invention, there is provided a method for using a composition to join together two substrates, including the steps of: (a) applying the composition to at least one of two substrate surfaces; (b) mating the substrate surfaces in abutting relationship to form an assembly; (c) exposing the composition to moisture; and (d) maintaining the abutting relationship for a time sufficient to allow the composition to foam and cure. In this method, the composition includes: (a) at least one compound having at least one enoxysilyl functional group; (b) at least one compound having at least one alkoxysilyl functional group; (c) at least one compound having at least one silicon hydride functional group; and (d) a hindered amine.

In a further aspect of the invention, there is provided a composition including the reaction product of: (a) at least one compound having at least one enoxysilyl functional group; (b) at least one compound having at least one alkoxysilyl functional group; (c) at least one compound having at least one silicon hydride functional group; and (d) a hindered amine, where hydrogen gas is generated upon exposure of the composition to moisture, resulting in foaming of the composition.

In yet another aspect of the invention, there is provided a method of making a gasket, such as for a machine or engine where the gasket is formed in situ in its intended end-use application by: (a) mating two components of the machine or engine in a face-to-face relationship, each of said components having a mating face, at least one of said faces having a groove therein for defining the gasket; (b) providing a curable composition in the groove; and (c) allowing the composition to foam and cure. In this method, the composition includes: (a) at least one compound having at least one enoxysilyl functional group; (b) at least one compound having at least one alkoxysilyl functional group; (c) at least one compound having at least one silicon hydride functional group; and (d) a hindered amine.

In an additional aspect of the invention, there is provided an article of manufacture including at least two substrate surfaces joined together with a curable composition. In this method, the composition includes: (a) at least one compound having at least one enoxysilyl functional group; (b) at least one compound having at least one alkoxysilyl functional group; (c) at least one compound having at least one silicon hydride functional group; and (d) a hindered amine, where hydrogen gas is generated upon exposure of the composition to moisture, resulting in foaming of the composition.

In another aspect of the invention, there is provided a two-part, foaming RTV silicone composition including: (a) a first part including: (i) at least one compound having at least one enoxysilyl functional group; (ii) at least one compound having at least one alkoxysilyl functional group; and (iii) a hindered amine; and (b) a second part including at least one compound having at least one silicon hydride functional group, where after the first part and the second part are mixed, hydrogen gas is generated upon exposure of the composition to moisture, resulting in foaming of the composition.

In still another aspect of the invention, there is provided a method for preparing a foaming RTV composition including the steps of mixing: (a) a first part including: (i) at least one compound having at least one enoxysilyl functional group; (ii) at least one compound having at least one alkoxysilyl functional group; and (iii) a hindered amine; and (b) a second part including at least one compound having at least one silicon-hydride functional group to form a composition, where hydrogen gas is generated upon exposure of the composition to moisture, resulting in foaming of the composition.

In a further aspect of the invention, there is provided a method for using a composition to join together two substrates, including the steps of: (a) applying the composition to at least one of two substrate surfaces; (b) mating the substrate surfaces in abutting relationship to form an assembly; (c) exposing the composition to moisture; and (d) maintaining the abutting relationship for a time sufficient to allow the composition to foam and cure. In this method, the composition includes: (a) a first part including: (i) at least one compound having at least one enoxysilyl functional group; (ii) at least one compound having at least one alkoxysilyl functional group; and (iii) a hindered amine; and (b) a second part including at least one compound having at least one silicon hydride functional group.

In yet another aspect of the invention, there is provided a composition including the reaction product of: (a) a first part including: (i) at least one compound having at least one enoxysilyl functional group; (ii) at least one compound having at least one alkoxysilyl functional group; and (iii) a hindered amine; and (b) a second part including at least one compound having at least one silicon hydride functional group, where hydrogen gas is generated upon exposure of the composition to moisture, resulting in foaming of the composition.

In an additional aspect of the invention, there is a provided a method of making a gasket, such as for a machine or engine where the gasket is formed in situ in its intended end-use application by: (a) mating two components of the machine or engine in a face-to-face relationship, each of said components having a mating face, at least one of said faces having a groove therein for defining the gasket; (b) providing a curable composition into the groove; and (c) allowing the composition to foam and cure. The composition here includes: (a) a first part including: (i) at least one compound having at least one enoxysilyl functional group; (ii) at least one compound having at least one alkoxysilyl functional group; and (iii) a hindered amine; and (b) a second part including at least one compound having at least one silicon hydride functional group.

In another aspect of the invention, there is provided an article of manufacture including at least two substrate surfaces joined together with a curable composition. Here, the composition includes: (a) a first part including: (i) at least one compound having at least one enoxysilyl functional group; (ii) at least one compound having at least one alkoxysilyl functional group; and (iii) a hindered amine; and (b) a second part including at least one compound having at least one silicon hydride functional group, where hydrogen gas is generated upon exposure of the composition to moisture, resulting in foaming of the composition.

In still another aspect of the invention, there is provided a foaming RTV silicone composition including: (a) at least one compound having at least one enoxysilyl functional group, at least one alkoxysilyl functional group, and at least one silicon hydride functional group and (b) a hindered amine, where hydrogen gas is generated upon exposure of the composition to moisture, resulting in foaming of the composition.

In a further aspect of the invention, there is provided a method for preparing a one-part, foaming RTV composition including the steps of mixing: (a) at least one compound having at least one enoxysilyl functional group, at least one alkoxysilyl functional group, and at least one silicon hydride functional group; and (b) a hindered amine to form a composition, where hydrogen gas is generated upon exposure of the composition to moisture, resulting in foaming of the composition.

In yet another aspect of the invention, there is provided a method for using a composition to join together two substrates, including the steps of: (a) applying the composition to at least one of two substrate surfaces; (b) mating the substrate surfaces in abutting relationship to form an assembly; (c) exposing the composition to moisture; and (d) maintaining the abutting relationship for a time sufficient to allow the composition to foam and cure. In this method, the composition includes: (a) at least one compound having at least one enoxysilyl functional group, at least one alkoxysilyl functional group, and at least one silicon hydride functional group and (b) a hindered amine.

In an additional aspect of the invention, there is provided a composition including the reaction product of: (a) at least one compound having at least one enoxysilyl functional group, at least one alkoxysilyl functional group, and at least one silicon hydride functional group and (b) a hindered amine, where hydrogen gas is generated upon exposure of the composition to moisture, resulting in foaming of the composition.

In another aspect of the invention, there is provided a method of making a gasket for a machine or engine where the gasket is formed in situ in its intended end-use application by: (a) mating two components of the machine or engine in a face-to-face relationship, each of said components having a mating face, at least one of said faces having a groove therein for defining the gasket; (b) providing a curable composition in the groove; and (c) allowing the composition to foam and cure. In this method, the composition includes: (a) at least one compound having at least one enoxysilyl functional group, at least one alkoxysilyl functional group, and at least one silicon hydride functional group and (b) a hindered amine.

In still another aspect of the invention, there is provided an article of manufacture including at least two substrate surfaces joined together with a curable composition. In this method, the composition includes: (a) at least one compound having at least one enoxysilyl functional group, at least one alkoxysilyl functional group, and at least one silicon hydride functional group and (b) a hindered amine, where hydrogen gas is generated upon exposure of the composition to moisture, resulting in foaming of the composition.

In a further aspect of the invention, there is provided a two-part, foaming RTV silicone composition including: (a) a first part including: (i) at least one compound having at least one enoxysilyl functional group, at least one alkoxysilyl functional group, and at least one silicon hydride functional group and (ii) a hindered amine; and (b) a second part including at least one compound having at least one silicon hydride functional group, where hydrogen gas is generated upon exposure of the composition to moisture, resulting in foaming of the composition.

In yet another aspect of the invention, there is provided a method for preparing a foaming RTV composition including the steps of mixing: (a) a first part including: (i) at least one compound having at least one enoxysilyl functional group, at least one alkoxysilyl functional group, and at least one silicon hydride functional group and (ii) a hindered amine; and (b) a second part including at least one compound having at least one silicon hydride functional group to form a composition, where hydrogen gas is generated upon exposure of the composition to moisture, resulting in foaming of the composition.

In an additional aspect of the invention, there is provided a method for using a composition to join together two substrates, including the steps of: (a) applying the composition to at least one of two substrate surfaces; (b) mating the substrate surfaces in abutting relationship to form an assembly; (c) exposing the composition to moisture; and (d) maintaining the abutting relationship for a time sufficient to allow the composition to foam and cure. In this method, the composition includes: (a) a first part including: (i) at least one compound having at least one enoxysilyl functional group, at least one alkoxysilyl functional group, and at least one silicon hydride functional group and (ii) a hindered amine; and (b) a second part including at least one compound having at least one silicon hydride functional group.

In another aspect of the invention, there is provided a composition including the reaction product of: (a) a first part including: (i) at least one compound having at least one enoxysilyl functional group, at least one alkoxysilyl functional group, and at least one silicon hydride functional group and (ii) a hindered amine; and (b) a second part including at least one compound including at least one silicon hydride functional group, where hydrogen gas is generated upon exposure of the composition to moisture, resulting in foaming of the composition.

In still another aspect of the invention, there is provided a method of making a gasket for a machine or engine where the gasket is formed in situ in its intended end-use application by: (a) mating two components of the machine or engine in a face-to-face relationship, each of said components having a mating face, at least one of said faces having a groove therein for defining the gasket; (b) providing a curable composition into the groove; and (c) allowing the composition to foam and cure. In this method, the composition includes: (a) a first part including: (i) at least one compound having at least one enoxysilyl functional group, at least one alkoxysilyl functional group, and at least one silicon hydride functional group and (ii) a hindered amine; and (b) a second part including at least one compound having at least one silicon hydride functional group.

In a further aspect of the invention, there is provided an article of manufacture including at least two substrate surfaces joined together with a curable composition. The composition here includes: (a) a first part including: (i) at least one compound having at least one enoxysilyl functional group, at least one alkoxysilyl functional group, and at least one silicon hydride functional group and (ii) a hindered amine; and (b) a second part including at least one compound having at least one silicon hydride functional group, where hydrogen gas is generated upon exposure of the composition to moisture, resulting in foaming of the composition.

In yet another aspect of the invention, there is provided a foaming RTV silicone composition including: (a) at least one compound having at least one alkoxysilyl functional group and at least one silicon hydride functional group; (b) at least one compound having at least one enoxysilyl functional group; and (c) a hindered amine, where hydrogen gas is generated upon exposure of the composition to moisture, resulting in foaming of the composition.

In an additional aspect of the invention, there is provided a method for preparing a foaming RTV composition including the steps of mixing: (a) at least one compound having at least one alkoxysilyl functional group and at least one silicon hydride functional group; (b) at least one compound having at least one enoxysilyl functional group; and (c) a hindered amine to form a composition, where hydrogen gas is generated upon exposure of the composition to moisture, resulting in foaming of the composition.

In another aspect of the invention, there is provided a method for using a composition to join together two substrates, including the steps of: (a) applying the composition to at least one of two substrate surfaces; (b) mating the substrate surfaces in abutting relationship to form an assembly; (c) exposing the composition to moisture; and (d) maintaining the abutting relationship for a time sufficient to allow the composition to foam and cure. In this method, the composition includes: (a) at least one compound having at least one alkoxysilyl functional group and at least one silicon hydride functional group; (b) at least one compound having at least one enoxysilyl functional group; and (c) a hindered amine.

In still another aspect of the invention, there is provided a composition including the reaction product of: (a) at least one compound having at least one alkoxysilyl functional group and at least one silicon hydride functional group; (b) at least one compound having at least one enoxysilyl functional group; and (c) a hindered amine, where hydrogen gas is generated upon exposure of the composition to moisture, resulting in foaming of the composition.

In a further aspect of the invention, there is provided a method of making a gasket for a machine or engine where the gasket is formed in situ in its intended end-use application by: (a) mating two components of the machine or engine in a face-to-face relationship, each of said components having a mating face, at least one of said faces having a groove therein for defining the gasket; (b) providing a curable composition in the groove; and (c) allowing the composition to foam and cure. In this method, the composition includes: (a) at least one compound having at least one alkoxysilyl functional group and at least one silicon hydride functional group; (b) at least one compound having at least one enoxysilyl functional group; and (c) a hindered amine.

In yet another aspect of the invention, there is provided an article of manufacture including at least two substrate surfaces joined together with a curable composition. The composition here includes: (a) at least one compound having at least one alkoxysilyl functional group and at least one silicon hydride functional group; (b) at least one compound having at least one enoxysilyl functional group; and (c) a hindered amine, where hydrogen gas is generated upon exposure of the composition to moisture, resulting in foaming of the composition.

In an additional aspect of the invention, there is provided a two-part, foaming RTV silicone composition including: (a) a first part including: (i) at least one compound having at least one alkoxysilyl functional group and at least one silicon hydride group; (ii) at least one compound having an enoxysilyl functional group; and (iii) a hindered amine; and (b) a second part including at least one compound having at least one silicon hydride functional group, where hydrogen gas is generated upon exposure of the composition to moisture, resulting in foaming of the composition.

In another aspect of the invention, there is provided a method for preparing a foaming RTV composition including the steps of mixing: (a) a first part including: (i) at least one compound having at least one alkoxysilyl functional group and at least one silicon hydride functional group; (ii) at least one compound having at least one enoxysilyl functional group; and (iii) a hindered amine; and (b) a second part including at least one compound having at least one silicon hydride functional group to form a composition, where hydrogen gas is generated upon exposure of the composition to moisture, resulting in foaming of the composition.

In still another aspect of the invention, there is provided a method for using a composition to join together two substrates, including the steps of: (a) applying the composition to at least one of two substrate surfaces; (b) mating the substrate surfaces in abutting relationship to form an assembly; (c) exposing the composition to moisture; and (d) maintaining the abutting relationship for a time sufficient to allow the composition to foam and cure. In this method, the composition includes: (a) a first part including: (i) at least one compound having at least one alkoxysilyl functional group and at least one silicon hydride functional group; (ii) a compound having at least one enoxysilyl functional group; and (iii) a hindered amine; and (b) a second part including at least one compound having at least one silicon hydride functional group.

In a further aspect of the invention, there is provided a composition including the reaction product of: (a) a first part including: (i) at least one compound having at least one alkoxysilyl functional group and at least one silicon hydride functional group; (ii) at least one compound having at least one enoxysilyl functional group; and (iii) a hindered amine; and (b) a second part including at least one compound including at least one silicon hydride functional group, where hydrogen gas is generated upon exposure of the composition to moisture, resulting in foaming of the composition.

In yet another aspect of the invention, there is provided a method of making a gasket for a machine or engine where the gasket is formed in situ in its intended end-use application by: (a) mating two components of the machine or engine in a face-to-face relationship, each of said components having a mating face, at least one of said faces having a groove therein for defining the gasket; (b) providing a curable composition into the groove; and (c) allowing the composition to foam and cure. In this method, the composition includes: (a) a first part including: (i) at least one compound having at least one alkoxysilyl functional group and at least one silicon hydride functional group; (ii) at least one compound having at least one enoxysilyl functional group; and (iii) a hindered amine; and (b) a second part including at least one compound having at least one silicon hydride functional group.

In an additional aspect of the invention, there is provided an article of manufacture including at least two substrate surfaces joined together with a curable composition. The composition here includes: (a) a first part including: (i) at least one compound having at least one alkoxysilyl functional group and at least one silicon hydride functional group; (ii) a compound having at least one enoxysilyl functional group; and (iii) a hindered amine; and (b) a second part including at least one compound having at least one silicon hydride functional group, where hydrogen gas is generated upon exposure of the composition to moisture, resulting in foaming of the composition.

In another aspect of the invention, there is provided a foaming RTV silicone composition including: (a) at least one compound having at least one enoxysilyl functional group and at least one silicon hydride functional group; (b) at least one compound having at least one alkoxysilyl functional group; and (c) a hindered amine, where hydrogen gas is generated upon exposure of the composition to moisture, resulting in foaming of the composition.

In still another aspect of the invention, there is provided a method for preparing a moisture-curable, foaming RTV composition including the steps of mixing: (a) at least one compound having at least one enoxysilyl functional group and at least one silicon hydride functional group; (b) at least one compound having at least one alkoxysilyl functional group; and (c) a hindered amine to form a composition, where hydrogen gas is generated upon exposure of the composition to moisture, resulting in foaming of the composition.

In a further aspect of the invention, there is provided a method for using a composition to join together two substrates, including the steps of: (a) applying a composition to at least one of two substrates; (b) mating the substrate surfaces in abutting relationship to form an assembly; (c) exposing the composition to moisture; and (d) maintaining the abutting relationship for a time sufficient to allow the composition to foam and cure. In this method, the composition includes: (a) at least one compound having at least one enoxysilyl functional group and at least one silicon hydride functional group; (b) at least one compound having at least one alkoxysilyl functional group; and (c) a hindered amine.

In yet another aspect of the invention, there is provided a composition including the reaction product of: (a) at least one compound having at least one enoxysilyl functional group and at least one silicon hydride functional group; (b) at least one compound having at least one alkoxysilyl functional group; and (c) a hindered amine, where hydrogen gas is generated upon exposure of the composition to moisture, resulting in foaming of the composition.

In an additional aspect of the invention, there is provided a method of making a gasket for a machine or engine where the gasket is formed in situ in its intended end-use application by: (a) mating two components of the machine or engine in a face-to-face relationship, each of said components having a mating face, at least one of said faces having a groove therein for defining the gasket; (b) providing a curable composition in the groove; and (c) allowing the composition to foam and cure. In this method, the composition includes: (a) at least one compound having at least one enoxysilyl functional group and at least one silicon hydride functional group; (b) at least one compound having at least one alkoxysilyl functional group; and (c) a hindered amine.

In another aspect of the invention, there is provided an article of manufacture including at least two substrate surfaces joined together with a curable composition. The composition here includes: (a) at least one compound having at least one enoxysilyl functional group and at least one silicon hydride functional group; (b) at least one compound having at least one alkoxysilyl functional group; and (c) a hindered amine, where hydrogen gas is generated upon exposure of the composition to moisture, resulting in foaming of the composition.

In still another aspect of the invention, there is provided a two-part, foaming RTV silicone composition including: (a) a first part including: (i) at least one compound having at least one enoxysilyl functional group and at least one silicon hydride group; (ii) at least one compound having an alkoxysilyl functional group; and (iii) a hindered amine; and (b) a second part including at least one compound having at least one silicon hydride functional group, where hydrogen gas is generated upon exposure of the composition to moisture, resulting in foaming of the composition.

In a further aspect of the invention, there is provided a method for preparing a foaming RTV composition including the steps of mixing: (a) a first part including: (i) at least one compound having at least one enoxysilyl functional group and at least one silicon hydride functional group; (ii) at least one compound having at least one alkoxysilyl functional group; and (iii) a hindered amine; and (b) a second part including at least one compound having at least one silicon hydride functional group to form a composition, where hydrogen gas is generated upon exposure of the composition to moisture, resulting in foaming of the composition.

In yet another aspect of the invention, there is provided a method for using a composition to join together two substrates, including the steps of: (a) applying the composition to at least one of two substrate surfaces; (b) mating the substrate surfaces in abutting relationship to form an assembly; (c) exposing the composition to moisture; and (d) maintaining the abutting relationship for a time sufficient to allow the composition to foam and cure. In this method, the composition includes: (a) a first part including: (i) at least one compound having at least one enoxysilyl functional group and at least one silicon hydride functional group; (ii) a compound having at least one alkoxysilyl functional group; and (iii) a hindered amine; and (b) a second part including at least one compound having at least one silicon hydride functional group.

In an additional aspect of the invention, there is provided a composition including the reaction product of: (a) a first part including: (i) at least one compound having at least one enoxysilyl functional group and at least one silicon hydride functional group; (ii) at least one compound having at least one alkoxysilyl functional group; and (iii) a hindered amine; and (b) a second part including at least one compound including at least one silicon hydride functional group, where hydrogen gas is generated upon exposure of the composition to moisture, resulting in foaming of the composition.

In another aspect of the invention, there is provided a method of making a gasket for a machine or engine where the gasket is formed in situ in its intended end-use application by: (a) mating two components of the machine or engine in a face-to-face relationship, each of said components having a mating face, at least one of said faces having a groove therein for defining the gasket; (b) providing a curable composition into the groove; and (c) allowing the composition to foam and cure. In this method, the composition includes: (a) a first part including: (i) at least one compound having at least one enoxysilyl functional group and at least one silicon hydride functional group; (ii) at least one compound having at least one alkoxysilyl functional group; and (iii) a hindered amine; and (b) a second part including at least one compound having at least one silicon hydride functional group.

In still another aspect of the invention, there is provided an article of manufacture including at least two substrate surfaces joined together with a curable composition. Here, the composition includes: (a) a first part including: (i) at least one compound having at least one enoxysilyl functional group and at least one silicon hydride functional group; (ii) a compound having at least one alkoxysilyl functional group; and (iii) a hindered amine; and (b) a second part including at least one compound having at least one silicon hydride functional group, where hydrogen gas is generated upon exposure of the composition to moisture, resulting in foaming of the composition.

In a further aspect of the invention, there is provided a foaming RTV silicone composition including: (a) at least one compound having at least one alkoxysilyl functional group and at least one enoxysilyl functional group; (b) at least one compound having at least one silicon hydride functional group; and (c) a hindered amine, where hydrogen gas is generated upon exposure of the composition to moisture, resulting in foaming of the composition.

In yet another aspect of the invention, there is provided a method for preparing a moisture-curable, foaming RTV composition including mixing: (a) at least one compound having at least one alkoxysilyl functional group and at least one enoxysilyl functional group; (b) at least one compound having at least one silicone hydride functional group; and (c) a hindered amine to form a composition, where hydrogen gas is generated upon exposure of the composition to moisture, resulting in foaming of the composition.

In an additional aspect of the invention, there is provided a method for using a composition to join together two substrates, including the steps of: (a) applying the composition to at least one of two substrate surfaces; (b) mating the substrate surfaces in abutting relationship to form an assembly; (c) exposing the composition to moisture; and (d) maintaining the abutting relationship for a time sufficient to allow the composition to foam and cure. In this method, the composition includes: (a) at least one compound having at least one alkoxysilyl functional group and at least one enoxysilyl functional group; (b) at least one compound having at least one silicon hydride functional group; and (c) a hindered amine.

In another aspect of the invention, there is provided a composition including the reaction product of: (a) at least one compound having at least one alkoxysilyl functional group and at least one enoxysilyl functional group; (b) at least one compound having at least one silicon hydride functional group; and (c) a hindered amine, where hydrogen gas is generated upon exposure of the composition to moisture, resulting in foaming of the composition.

In still another aspect of the present invention, there is provided a method of making a gasket for a machine or engine where the gasket is formed in situ in its intended end-use application by: (a) mating two components of the machine or engine in a face-to-face relationship, each of said components having a mating face, at least one of said faces having a groove therein for defining the gasket; (b) providing a curable composition to the groove; and (c) allowing the composition to foam and cure. In this method, the composition includes: (a) at least one compound having at least one alkoxysilyl functional group and at least one enoxysilyl functional group; (b) at least one compound having at least one silicon hydride functional group; and (c) a hindered amine.

In a further aspect of the invention, there is provided an article of manufacture including at least two substrate surfaces joined together with a curable composition. Here, the composition includes: (a) a first part including: (i) at least one compound having at least one enoxysilyl functional group and at least one alkoxysilyl functional group and (ii) a hindered amine; and (b) a second part including at least one compound having at least one silicon hydride functional group, where hydrogen gas is generated upon exposure of the composition to moisture, resulting in foaming of the composition.

In yet another aspect of the invention, there is provided a two-part, foaming RTV silicone composition including: (a) a first part including: (i) at least one compound having at least one alkoxysilyl functional group and at least one enoxysilyl functional group and (ii) a hindered amine, and (b) a second part including at least one silicon hydride functional group, where hydrogen gas is generated upon exposure of the composition to moisture, resulting in foaming of the composition.

In an additional aspect of the invention, there is provided a method for preparing a foaming RTV composition including mixing: (a) a first part including: (i) at least one compound having at least one alkoxysilyl functional group and at least one enoxysilyl functional group and (ii) a hindered amine, and (b) a second part including at least one compound having at least one silicone hydride functional group to form a composition, where hydrogen gas is generated upon exposure of the composition to moisture, resulting in foaming of the composition.

In another aspect of the invention, there is provided a method for using a composition to join together two substrates, including the steps of: (a) applying the composition to at least one of two substrate surfaces; (b) mating the substrate surfaces in abutting relationship to form an assembly; (c) exposing the composition to moisture; and (d) maintaining the abutting relationship for a time sufficient to allow the composition to foam and cure. In this method, the composition includes: (a) a first part including: (i) at least one compound having at least one alkoxysilyl functional group and at least one enoxysilyl functional group and (ii) a hindered amine, and (b) a second part including at least one silicon hydride functional group.

In still another aspect of the invention, there is provided a composition including the reaction product of: (a) a first part including: (i) at least one compound having at least one alkoxysilyl functional group and at least one enoxysilyl functional group and (ii) a hindered amine, and (b) a second part including at least one compound having at least one silicon hydride functional group, where hydrogen gas is generated upon exposure of the composition to moisture, resulting in foaming of the composition.

In a further aspect of the present invention, there is provided a method of making a gasket for a machine or engine where the gasket is formed in situ in its intended end-use application by: (a) mating two components of the machine or engine in a face-to-face relationship, each of said components having a mating face, at least one of said faces having a groove therein for defining the gasket; (b) providing a curable composition to the groove; and (c) allowing the composition to foam and cure. In this method, the composition includes: (a) a first part including (i) at least one compound having at least one alkoxysilyl functional group and at least one enoxysilyl functional group and (ii) a hindered amine, and (b) a second part including at least one compound having at least one silicon hydride functional group.

In yet another aspect of the invention, there is provided an article of manufacture including at least two substrate surfaces joined together with a curable composition. Here, the composition includes: (a) a first part including: (i) at least one compound having at least one enoxysilyl functional group and at least one alkoxysilyl functional group and (ii) a hindered amine; and (b) a second part including at least one compound having at least one silicon hydride functional group, where hydrogen gas is generated upon exposure of the composition to moisture, resulting in foaming of the composition.

In an additional aspect of the invention, there is provided a polyorganosiloxane represented by the Formula (I):

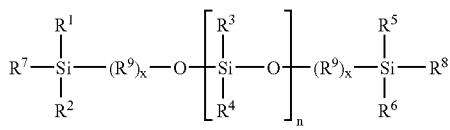

where $R^1$, $R^2$, $R^3$, $R^4$, $R^5$, $R^6$, $R^7$, and $R^8$ may be the same or different and are selected from the group consisting of hydrogen, substituted hydrocarbon radicals, unsubstituted hydrocarbon radicals, a silicon hydride functional group, alkoxy, and enoxy, wherein n is an integer from 1 to 1200, wherein $R^9$ is a substituted or unsubstituted alkyl, which may be interrupted with a heteroatom, wherein x is 0-1, wherein at least one of $R^1$, $R^2$, $R^3$, $R^4$, $R^5$, $R^6$, $R^7$, and $R^8$ is an alkoxy functional group or is a hydrocarbon radical substituted with at least one alkoxy functional group, and wherein at least one of $R^1$, $R^2$, $R^3$, $R^4$, $R^5$, $R^6$, $R^7$, and $R^8$ is an enoxy functional group or is a hydrocarbon radical substituted with at least one enoxy functional group.

DETAILED DESCRIPTION OF THE INVENTION

The present invention is directed to elastomeric foaming compositions, to methods of preparing such compositions, and to methods of using such compositions to seal together substrates. The present invention also is directed to methods for making a gasket. Moreover, the present invention is directed to articles of manufacture including at least two substrate surfaces that are joined together with the present inventive compositions.

The present invention provides curable foaming elastomeric compositions that produce an elastomeric foam in situ upon application on a substrate without the addition of a blowing agent or heat. In particular, the compositions of the present invention rely on the reaction of at least one enoxysilyl functional group and/or at least one alkoxysilyl functional group with water in the atmosphere to produce a hydroxy functional silicone (i.e., a silanol) and an alcohol. The alcohol then condenses with at least one silicon hydride functional group in the presence of an amine catalyst to liberate hydrogen gas in situ, resulting in the formation of a foam as the composition undergoes condensation curing. Closed cell foams are desirably formed from the present invention. Open cell foams, however, also can be formed.

The present inventive compositions can include one or two parts. The one-part compositions are formulated to include at least one enoxysilyl functional group and/or at least one alkoxysilyl functional group, at least one amine catalyst, and at least one silicon hydride functional group. The two-part compositions include: (a) a first part that includes at least one enoxysilyl functional group and/or at least one alkoxysilyl functional group and an amine catalyst and (b) a second part that includes at least one silicon hydride functional group.

With respect to the one-part compositions, the at least one enoxysilyl functional group, the at least alkoxysilyl functional group, and the at least one silicon hydride functional group can be present on the same compound or on different compounds. The at least one enoxysilyl functional group and the at least one alkoxysilyl functional group can be polymer-bound and/or present on pendant and/or terminal groups of any polymeric compound and/or present on free-floating silanes. Likewise, the at least one silicon hydride functionality can be polymer-bound and/or present on pendant or terminal groups of any compound.

With respect to the two-part compositions of the present invention, the at least one enoxysilyl functional group and/or the at least one alkoxysilyl functional group in the first part can be present on the same compound or on different compounds. Moreover, the enoxysilyl functional group and/or the alkoxysilyl functional group can be polymer-bound, present on pendant or terminal groups of a compound, or present as free-floating silanes. Likewise, the at least one silicon hydride functionality can be polymer-bound and/or present on pendant or terminal groups of any compound. Optionally, at least one silicon hydride functionality can be incorporated in the first part of the two-part compositions.

Accordingly, any suitable polyorganosiloxane having at least one enoxy functional group and/or at least one alkoxy functional group and/or at least one hydride functional group can be used in the present inventive compositions.

A useful polyorganosiloxane for use in the present inventive compositions is represented by Formula (I):

(I)

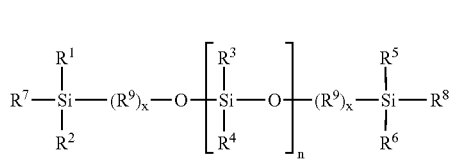

wherein $R^1$, $R^2$, $R^3$, $R^4$, $R^5$, $R^6$, $R^7$, and $R^8$ may be the same or different and are selected from the group consisting of hydrogen, substituted hydrocarbon radicals, including hydrocarbon radicals substituted with at least one alkoxy functional group and/or at least one enoxy functional group and/or at least one silicon hydride functional group, unsubstituted hydrocarbon radicals, alkoxy, and enoxy, wherein at least one of $R^1$, $R^2$, $R^3$, $R^4$, $R^5$, $R^6$, $R^7$, and $R^8$ is an alkoxy functional group or a hydrocarbon radical substituted with at least one alkoxy functional group or an enoxy functional group or a hydrocarbon radical substituted with at least one enoxy functional group, wherein n is an integer from 1 to 1200, wherein $R^9$ is a substituted or unsubstituted alkyl, which may be interrupted with a heteroatom, and wherein x is 0-1. In this regard, the heteroatom can be any heteroatom, including sulfur, oxygen, and nitrogen.

A particularly useful compound for use in the present inventive compositions is a compound of Formula I, wherein $R^1$, $R^2$, $R^3$, $R^4$, $R^5$, and $R^6$ may be the same or different and are independently selected from the group consisting of hydrogen, substituted hydrocarbon radicals, including hydrocarbon radicals substituted with at least one alkoxy functional group and/or at least one enoxy functional group and/or at least one silicon hydride functional group, unsubstituted hydrocarbon radicals, alkoxy, and enoxy, wherein n is an integer from 1 to 1200, wherein $R^9$ is a substituted or unsubstituted alkyl, which may be interrupted with a heteroatom, wherein x is 0-1, and wherein $R^7$ and $R^8$ are each an alkoxy functional group.

Another particularly useful compound for use in the present inventive compositions is a compound of Formula I, wherein $R^1$, $R^2$, $R^3$, $R^4$, $R^5$, and $R^6$ may be the same or different and are selected from the group consisting of hydrogen, substituted hydrocarbon radicals, including hydrocarbon radicals substituted with at least one alkoxy functional group and/or at least one enoxy functional group and/or at least one silicon hydride functional group, unsubstituted hydrocarbon radicals, alkoxy, and enoxy, wherein n is an integer from 1 to 1200, wherein $R^9$ is a substituted or unsubstituted alkyl, which may be interrupted with a heteroatom, wherein x is 0-1, wherein $R^7$ and $R^8$ are each an alkoxy functional group, and wherein at least one of $R^1$, $R^2$, $R^3$, $R^4$, $R^5$, and $R^6$ is hydrogen or hydrocarbon radical substituted with at least one silicon hydride functionality.

Yet another useful compound for use in the present inventive compositions is a compound of Formula I, wherein $R^1$, $R^2$, $R^3$, $R^4$, $R^5$, and $R^6$ may be the same or different and are selected from the group consisting of hydrogen, substituted hydrocarbon radicals, including hydrocarbon radicals substituted with at least one alkoxy functional group and/or at least one enoxy functional group and/or at least one silicon hydride functional group, unsubstituted hydrocarbon radicals, alkoxy, and enoxy, wherein n is an integer from 1 to 1200, wherein $R^9$ is a substituted or unsubstituted alkyl, which may be interrupted with a heteroatom, wherein x is 0-1, and wherein $R^7$ and $R^8$ are each an enoxy functional group.

Another particularly useful compound for use in the present inventive compositions is a compound of Formula I, wherein $R^1$, $R^2$, $R^3$, $R^4$, $R^5$, and $R^6$ may be the same or different and are selected from the group consisting of hydrogen, substituted hydrocarbon radicals, including hydrocarbon radicals substituted with at least one alkoxy functional group and/or at least one enoxy functional group and/or at least one silicon hydride functional group, unsubstituted hydrocarbon radicals, alkoxy, and enoxy, wherein n is an integer from 1 to 1200, wherein $R^9$ is a substituted or unsubstituted alkyl, which may be interrupted with a heteroatom, wherein x is 0-1, wherein $R^7$ and $R^8$ are each an enoxy functional group, and wherein at least one of $R^1$, $R^2$, $R^3$, $R^4$, $R^5$, and $R^6$ is hydrogen or hydrocarbon radical substituted with at least one silicon hydride functionality.

Still another useful compound for use in the present inventive compositions is a compound of Formula I, wherein $R^1$, $R^2$, $R^3$, $R^4$, $R^5$, and $R^6$ may be the same or different and are selected from the group consisting of hydrogen, substituted hydrocarbon radicals, including hydrocarbon radicals substituted with at least one alkoxy functional group and/or at least one enoxy functional group and/or at least one silicon hydride functional group, unsubstituted hydrocarbon radicals, alkoxy, and enoxy, wherein n is an integer from 1 to 1200, wherein $R^9$ is a substituted or unsubstituted alkyl, which may be interrupted with a heteroatom, wherein x is 0-1, wherein one of $R^7$ and $R^8$ is an alkoxy functional group and the other of $R^7$ and $R^8$ is an enoxy functional group.

Another particularly useful compound for use in the present inventive compositions is a compound of Formula I, wherein $R^1$, $R^2$, $R^3$, $R^4$, $R^5$ and $R^6$ may be the same or different and are selected from the group consisting of hydrogen, substituted hydrocarbon radicals, including hydrocarbon radicals substituted with at least one alkoxy functional group and/or at least one enoxy functional group and/or at least one silicon hydride functional group, unsubstituted hydrocarbon radicals, alkoxy, and enoxy, wherein n is an integer from 1 to 1200, wherein $R^9$ is a substituted or unsubstituted alkyl, which may be interrupted with a heteroatom, wherein x is 0-1, wherein one of $R^7$ and $R^8$ is an alkoxy functional group and the other of $R^7$ and $R^8$ is an enoxy functional group, and wherein at least one of $R^1$, $R^2$, $R^3$, $R^4$, $R^5$, and $R^6$ is hydrogen or hydrocarbon radical substituted with at least one silicon hydride functionality.

The present inventive compositions also can contain mixtures of compounds conforming to Formula I.

Any hydroxy functional silicone can be included in the present inventive compositions. By hydroxy functional silicone is meant any silicone compound having at least one hydroxy functional group. A particularly useful hydroxy functional silicone is silanol terminated polydimethylsiloxane (PDMS).

The hydroxy functional silicone can have any suitable viscosity. For example, the hydroxy functional silicone can have a viscosity from about 50 mPaS to about 100,000 mPaS.

The hydroxy functional silicone can be present in any suitable amount. For example, the hydroxy functional silicone can be present in an amount from about 50 percent by weight to about 99 percent by weight of the total composition.

Any silane having at least one enoxy functional group and/or at least one alkoxy functional group and/or at least one hydride functional group can be used in the present inventive compositions. Suitable silanes for inclusion in the present inventive compositions include, for example, any dienoxymonoalkoxysilane, any tetraenoxysilane, any enoxydialkoxysilane, any enoxytrialkoxysilane, and any monoalkoxytrienoxysilane, such as methyltrienoxysilane. Suitable silanes also include any silane substituted with at least one alkyl, aryl or vinyl group, including silanes substituted with at least one hexyl or octyl group. Additionally, mixtures of such silanes can be included in the present inventive compositions. Particularly useful silanes having at least one enoxy functional group and/or at least one alkoxy functional group include, for example, trimethylmethoxysilane, tetraethoxysilane, octyltrimethoxysilane, dimethyldimethoxysilane, dimethylmethoxyenoxysilane, methyldimethoxyenoxysilane, methyltrimethoxysilane, methacryloxymethyltrimethoxysilane, methacryloxypropyltrimethoxysilane, glycidoxypropyltrimethoxysilane, aminopropyltrimethoxysilane, methyltrienoxysilane, phenyltrienoxysilane, and the like. Desirably, vinyltrienoxysilane and/or vinyltrimethoxysilane are included in the present inventive compositions.

The silane having at least one enoxy functional group and/or at least one alkoxy functional group and/or at least one hydride functional group can be incorporated in the present inventive compositions in any suitable amount. In particular, the silane having at least one enoxy functional group and/or at least one alkoxy functional group and/or at least one hydride functional group is present in an amount from about 1 percent by weight to about 99 percent by weight of the total composition. As used herein, the phrase total composition includes compositions having one part and compositions having a first part and a second part. Desirably, an enoxysilane is present in an amount from about 0.25 percent by weight to about 5 percent by weight of the total composition, and an alkoxysilane is present in an amount from about 0.25 percent by weight to about 5 percent by weight.

Moreover, the ratio of the alkoxy functional group to the enoxy functional group in the present inventive compositions can be any suitable ratio. Desirably, the ratio of the alkoxy functional group to the enoxy functional group in the present inventive compositions is 0.1:10.

Any suitable silicon hydride-containing composition can be included in the present inventive compositions. For example, a suitable silicon hydride-containing composition is represented by Formula (II):

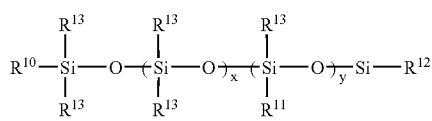

(II)

wherein $R^{10}$, $R^{11}$, $R^{12}$, and $R^{13}$ may be the same or different and are selected from the group consisting of hydrogen, substituted hydrocarbon radicals, including hydrocarbon radicals substituted with at least one alkoxy functional group and/or at least one enoxy functional group, unsubstituted hydrocarbon radicals, alkoxy, and enoxy, wherein x is an integer from 1 to 1,000, and wherein y is an integer from 1 to 20, with the proviso that at least one of $R^{10}$, $R^{11}$, $R^{12}$ and $R^{13}$ is hydrogen.

A particularly useful silicon hydride-containing compound for use in the present inventive compositions is a compound of Formula II, wherein at least two of $R^{10}$, $R^{11}$, and $R^{12}$ are H; otherwise $R^{10}$, $R^{11}$, and $R^{12}$ can be the same or different and can be a substituted or unsubstituted hydrocarbon radical from $C_{1-20}$; wherein $R^{13}$ also can be a substituted or unsubstituted hydrocarbon radical from $C_{1-20}$; wherein x is an integer from 1 to 1,000; and wherein y is an integer from 1 to 20.

Another useful silicon hydride-containing composition for use in the present inventive compositions has the formula $R^{14}{}_n Si(X)_{4-n}$, wherein the $R^{14}$ groups are the same or different and selected from the group consisting of hydrogen, $C_1$-$C_{12}$ alkyl, $C_6$-$C_{12}$ aryl, $C_7$-$C_8$ arylalkyl, $C_7$-$C_{18}$ alkylaryl, haloalkyl, haloaryl, and monovalent ethylenically unsaturated radicals, wherein X is a hydrolyzable functionality selected from the group consisting of alkoxy, oximino, enoloxy, amino, and amido, and wherein n is an integer from 0-1.

Silicon hydride can be present in any suitable amount. For example, it is useful to incorporate a silicon hydride-containing compound in an amount from about 0.1 percent by weight of the total composition to about 20 percent by weight of the entire composition. Desirably, a silicon hydride-containing compound is present in an amount from about 0.25 percent by weight to about 10 percent by weight of the total composition. Most desirably, a silicon hydride-containing compound is present in an amount from about 2 percent by weight to about 10 percent by weight of the total composition.

The present inventive compositions include at least one amine that acts as a catalyst by accelerating or otherwise promoting curing of the present inventive compositions. In accordance with the present invention, the amine acts as a catalyst by promoting condensation of alkoxy and/or enoxy on silicon. Desirably, the amine is a hindered amine.

By hindered amine is meant an amine that does not have an active hydrogen. Suitable hindered amines include, for example, tertiary amines represented by the formula $N(R)_3$, wherein R is selected from the group consisting of alkyl, aryl, alkaryl, or aralkyl radicals, including $C_{1-10}$ alkyl, $C_{1-6}$ aryl, $C_{7-15}$ alkaryl, and $C_{7-15}$ aralkyl radicals. Suitable hindered amines also include primary or secondary amines that do not contain an active hydrogen because the hydrogen is protected or sterically hindered.

Desirably, the amine has a pH or $K_B$ greater than about 10. More desirably, the amine has a pH or $K_B$ of 12 or greater.

Particularly useful hindered amines for inclusion in the present inventive compositions include, for example, 1,8-diazabicyclo(5.4.0)undec-7-ene (DBU), 1,4-diazabicyclo(2.2.2)octane (DABCO), triethylamine, and substituted guanidines, such as tetramethylguanidine (TMG).

The amine can be present in any suitable amount. For example, the amine can be present in an amount from about 0.01 percent by weight to about 10 percent by weight. Desirably, the amine is present in an amount from about 0.05 percent by weight to about 2 percent by weight. More desirably, the amine is present in amount from about 0.1 percent by weight to about 0.5 percent by weight.

Optionally, other catalysts besides hindered amines also may be included in the present inventive compositions in any suitable amount. Such catalysts include, for example, dialkyltindicarboxylates or alkyltitanates, and other known catalysts that promote the condensation of alkoxy and/or enoxy groups on silicon. A particularly useful tin catalyst for use in the present inventive compositions is dioctyltindicarboxylate.

The present inventive compositions also may include a reinforcing material or filler to provide enhanced mechanical properties. Generally, any suitable mineral, carbonaceous, glass, or ceramic filler may be used for this purpose. Suitable fillers include, for example, nanoparticles, ground quartz, tabular alumina, diatomaceous earth, reinforcing silicas, calcium carbonate, carbon black, titanium oxide, aluminum oxide, aluminum hydroxide, zinc oxide, glass fibers, iron oxide, barium zirconate, calcium carbonate, and the like.

Desirably, the filler is fumed silica or glass spheres. In this regard, the fumed silica may be untreated (hydrophilic) or treated with an adjuvant so as to render it hydrophobic. A particularly useful treated fumed silica is R8200, which is available from DeGussa.

Other additives including antioxidants, flame retardants, initiators, curatives, accelerators, and pigments also may included in the present inventive compositions. One of ordinary skill in the art may select any one or more of the additives in order to impart properties to the present inventive compositions and/or alter physical properties of the compositions as needed for particular applications.

EXAMPLES

Table 1 below sets forth a RTV foam made in accordance with the present invention that liberates acetone and methanol during cure.

TABLE 1

Inventive Composition A

| Component | Wt. % |
| --- | --- |
| hydroxy functional silicone[1] | 42.5 |
| hydroxy functional silicone[2] | 39.57 |
| filler[3] | 8.94 |
| silane containing at least one enoxy functionality[4] | 3.75 |
| silane containing at least one alkoxy functionality[5] | 1.61 |
| amine[6] | 0.05 |
| amine[7] | 0.37 |
| compound containing at least one silicone hydride functional group[8] | 3.21 |

[1]Silanol terminated polydimethylsiloxane (PDMS) 4,000 cPs.
[2]Silanol terminated polydimethylsiloxane (PDMS) 80,000 cPS.
[3]Treated fumed silica (R8200, available from DeGussa).
[4]Vinyltrienoxysilane.
[5]Vinyltrimethoxysilane.
[6]Tetramethylguanidine (TMG).
[7]1,8-diazabicyclo-(5.4.0)-undec-7-ene (DBU).
[8]Hydride G.E. DF 1040, available from G.E. Silicones.

Example 1

This example illustrates how to make a RTV foam in accordance with the present invention that liberates acetone and methanol during cure. In particular, this example sets forth how Composition A, which is made in accordance with Table 1, is a RTV foam that liberates acetone and methanol during cure.

Referring to Table 1, a silane containing at least one alkoxy functionality (i.e., vinyltrimethoxysilane) undergoes a hydrolysis reaction upon exposure to moisture in the atmosphere, thereby forming hydroxy functional silicones (i.e., PDMS 4,000 cPs and PDMS 80,000 cPs) and an alcohol (i.e., methanol). The compound containing at least one silicone hydride functional group (i.e., Hydride G.E. DF 1040) then reacts with the alcohol in the presence of amine catalysts (i.e., TMG and DBU) by way of a condensation reaction to produce water and hydrogen gas, while the silane containing at least one enoxy functionality reacts with the hydroxy functional silicones (i.e., PDMS 4,000 cPs and PDMS 80,000 cPs) by way of a condensation reaction to form a crosslinked elastomer, acetone, and water. The liberation of hydrogen gas during condensation of the alcohol results in foaming of the composition during curing.

Table 2 below sets forth a RTV foam made in accordance with the present invention that liberates acetone and ethanol during cure.

TABLE 2

Inventive Composition B

| Component | Wt. % |
| --- | --- |
| hydroxy-functional silicone[1] | 73.71 |
| filler[2] | 11.02 |
| silane containing at least one enoxy functionality[3] | 2.73 |
| silane containing at least one alkoxy functionality[4] | 2.18 |
| amine[5] | 0.05 |
| tin catalyst[6] | 0.05 |
| amine[7] | 0.44 |
| compound containing at least one silicone hydride functional group[8] | 4.91 |
| filler[9] | 4.91 |

[1]Silanol terminated polydimethylsiloxane (PDMS) 6,000 cPs.
[2]Treated fumed silica (R8200, available from DeGussa).
[3]Vinyltrienoxysilane.
[4]Vinyltriemethoxysilane.
[5]Tetramethylguanidine (TMG).
[6]Diocyltindicarboxylate.
[7]1,8-diazabicyclo-(5.4.0)-undec-7-ene (DBU).
[8]Hydride G.E. DF 1040, available from G.E. Silicones.
[9]Hollow glass spheres.

Example 2

This example illustrates how to make a RTV foam in accordance with the present invention that liberates acetone and methanol during cure. In particular, this example sets forth how Composition B, which is made in accordance with Table 2, is a RTV foam that liberates acetone and ethanol during cure.

Referring to Table 2, a silane containing at least one alkoxy functionality undergoes a hydrolysis reaction upon exposure to moisture in the atmosphere, thereby forming a hydroxy functional silicone (i.e., PDMS 6,000 cPs) and an alcohol (i.e., ethanol). The compound containing at least one silicon hydride functional group (i.e., Hydride G.E. DF 1040) then reacts with the alcohol in the presence of the amine catalysts (i.e., TMG and DBU) and the tin catalyst (diocyltindicarboxylate) by way of a condensation reaction to produce water and hydrogen gas, while the silane containing at least one enoxy functionality (i.e., vinyltrinenoxysilane) reacts with the silicone containing at least one hydride functionality (i.e., PDMS 6,000 cPs) by way of a condensation reaction to form a crosslinked elastomer, acetone, and water. The liberation of hydrogen gas during condensation of the alcohol results in foaming of the composition during curing.

What is claimed is:

1. A foaming RTV silicone composition comprising:
   (a) at least one compound having at least one enoxysilyl functional group;
   (b) at least one compound having at least one alkoxysilyl functional group;
   (c) at least one compound having at least one silicon hydride functional group; and
   (d) a hindered amine,
wherein hydrogen gas is generated upon exposure of the composition to moisture, resulting in foaming of the composition.

2. The composition of claim 1, wherein the compound having at least one enoxysilyl functional group is selected from the group consisting of phenyltrienoxysilane, methyltrienoxysilane, and vinyltrienoxysilane.

3. The composition of claim 1, wherein the compound having at least one alkoxysilyl functional group is selected from the group consisting of trimethylmethoxysilane, tetraethoxysilane, octyltrimethoxysilane, dimethyldimethoxysilane, dimethylmethoxyenoxysilane, methyldimethoxyenoxysilane, methyltrimethoxysilane, methacryloxymethyltrimethoxysilane, ethacryloxypropyltrimethoxysilane, glycidoxypropyltrimethoxysilane, aminopropyltrimethoxysilane, and vinyltrimethoxysilane.

4. The composition of claim 1, wherein the compound having at least one silicon hydride functional group is represented by Formula (II):

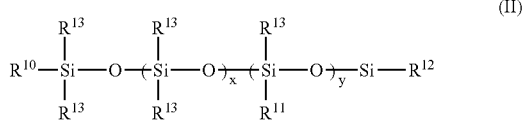

wherein $R^{10}$, $R^{11}$, $R^{12}$ and $R^{13}$ may be the same or different and are selected from the group consisting of hydrogen, substituted hydrocarbon radicals, including hydrocarbon radicals substituted with at least one alkoxy functional group and/or at least one enoxy functional group, unsubstituted hydrocarbon radicals, alkoxy, and enoxy, wherein x is an integer from 1 to 1,000, and wherein y is an integer from 1 to 20, with the proviso that at least one of $R^{10}$, $R^{11}$, $R^{12}$ and $R^{13}$ is hydrogen.

5. The composition of claim 1, wherein the hindered amine has a pH greater than about 10.

6. The composition of claim 1, wherein the hindered amine has a $K_B$ greater than about 10.

7. The composition of claim 1, wherein the hindered amine is selected from the group consisting of diazabicyclo(5.4.0)undec-7-ene (DBU), 1,4-diazabicyclo(2.2.2)octane (DABCO), triethylamine, and substituted guanidines.

8. A method for preparing a foaming RTV composition comprising the steps of mixing:
  (a) at least one compound having at least one enoxysilyl functional group;
  (b) at least one compound having at least one alkoxysilyl functional group;
  (c) at least one compound having at least one silicon hydride functional group; and
  (d) a hindered amine.

9. A method for using the composition of claim 1 to seal together two substrates, comprising the steps of:
  (a) applying the composition to at least one of two substrate surfaces;
  (b) mating the substrate surfaces in abutting relationship to form an assembly;
  (c) exposing the composition to moisture; and
  (d) maintaining the abutting relationship for a time sufficient to allow the composition to foam and cure.

10. A method of making a gasket for a machine or engine wherein the gasket is formed in situ in its intended end-use application by:
  (a) mating two components of the machine or engine in a face-to-face relationship, each of said components having a mating face, at least one of said faces having a groove therein for defining the gasket;
  (b) providing a curable composition in the groove; and
  (c) allowing the composition to foam and cure, wherein the composition is the composition of claim 1.

11. A two-part, foaming RTV silicone composition comprising:
  (a) a first part comprising:
    (i) at least one compound having at least one enoxysilyl functional group;
    (ii) at least one compound having at least one alkoxysilyl functional group; and
    (iii) a hindered amine; and
  (b) a second part comprising at least one compound having at least one silicon hydride functional group, wherein hydrogen gas is generated upon exposure of the composition to moisture, resulting in foaming of the composition.

12. The composition of claim 11, wherein the compound having at least one enoxysilyl functional group is selected from the group consisting of phenyltrienoxysilane, methyltrienoxysilane, and vinyltrienoxysilane.

13. The composition of claim 11, wherein the compound having at least one alkoxysilyl functional group is selected from the group consisting of trimethylmethoxysilane, tetraethoxysilane, octyltrimethoxysilane, dimethyldimethoxysilane, dimethylmethoxyenoxysilane, methyldimethoxyenoxysilane, methyltrimethoxysilane, methacryloxymethyltrimethoxysilane, methacryloxypropyltrimethoxysilane, glycidoxypropyltrimethoxysilane, aminopropyltrimethoxysilane, and vinyltrimethoxysilane.

14. The composition of claim 11, wherein the compound having at least one silicon hydride functional group is represented by the Formula (II):

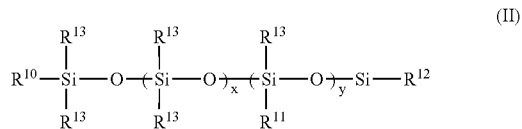

wherein $R^{10}$, $R^{11}$, $R^{12}$, and $R^{13}$ may be the same or different and are selected from the group consisting of hydrogen, substituted hydrocarbon radicals, including hydrocarbon radicals substituted with at least one alkoxy functional group and/or at least one enoxy functional group, unsubstituted hydrocarbon radicals, alkoxy, and enoxy, wherein x is an integer from 1 to 1,000, and wherein y is an integer from 1 to 20, with the proviso that at least one of $R^{10}$, $R^{11}$, $R^{12}$ and $R^{13}$ is hydrogen.

15. The composition of claim 11, wherein the hindered amine has a pH greater than about 10.

16. The composition of claim 11, wherein the hindered amine has a $K_B$ greater than about 10.

17. The composition of claim 11, wherein the hindered amine is selected from the group consisting of 1,8-diazabicyclo(5.4.0)undec-7-ene (DBU), 1,4-diazabicyclo(2.2.2.)octane (DABCO), triethylamine, and substituted guanidines.

18. A method for using the composition of claim 11 to seal together two substrates, comprising the steps of:
  (a) applying the composition to at least one of two substrate surfaces;
  (b) mating the substrate surfaces in abutting relationship to form an assembly;
  (c) exposing the composition to moisture; and
  (d) maintaining the abutting relationship for a time sufficient to allow the composition to foam and cure.

19. A composition comprising the reaction product of:
  (a) a first part comprising:
    (i) at least one compound having at least one enoxysilyl functional group;
    (ii) at least one compound having at least one alkoxysilyl functional group; and
    (iii) a hindered amine; and
  (b) a second part comprising at least one compound having at least one silicon hydride functional group.

20. A method of making a gasket for a machine or engine wherein the gasket is formed in situ in its intended end-use application by:
  (a) mating two components of the machine or engine in a face-to-face relationship, each of said components having a mating face, at least one of said faces having a groove therein for defining the gasket;
  (b) providing a curable composition into the groove; and
  (c) allowing the composition to foam and cure, wherein the composition is the composition of claim 11.

21. The foaming RTV silicone composition of claim 1, comprising:
  (a) a first part comprising:
    (i) the at least one compound having at least one enoxysilyl functional group;
    (ii) the at least one compound having at least one alkoxysilyl functional group; and
    (iii) the hindered amine; and
  (b) a second part comprising the at least one compound having at least one silicon hydride functional group.

\* \* \* \* \*